United States Patent
Stephan et al.

(10) Patent No.: US 6,744,354 B2
(45) Date of Patent: Jun. 1, 2004

(54) SYSTEM FOR SENSING WHETHER AN OBJECT STRUCK IN A COLLISION IS A PEDESTRIAN

(75) Inventors: Craig Hammann Stephan, Ann Arbor, MI (US); Kolita Mendis, Thousand Oaks, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,157

(22) Filed: Sep. 23, 2002

(65) Prior Publication Data

US 2004/0066286 A1 Apr. 8, 2004

(51) Int. Cl.⁷ .................................................. B60Q 1/00
(52) U.S. Cl. .................. 340/436; 340/435; 340/903; 73/12.01; 307/10.1
(58) Field of Search ................................. 340/436, 501, 340/605, 903, 904, 435; 367/909; 73/1.39, 12.01, 760; 280/734, 735, 728 R; 180/282, 232, 271; 307/10.1, 9.1, 121

(56) References Cited

U.S. PATENT DOCUMENTS

| | | | |
|---|---|---|---|
| 3,694,600 A | | 9/1972 | Koenig |
| 4,977,388 A | * | 12/1990 | Park .......................... 340/436 |
| 5,387,819 A | * | 2/1995 | Ueno et al. ................. 307/10.1 |
| 5,392,024 A | | 2/1995 | Kiuchi et al. |
| 5,495,414 A | * | 2/1996 | Spangler et al. .............. 701/45 |
| 5,797,623 A | | 8/1998 | Hubbard |
| 5,847,643 A | | 12/1998 | Keith |
| 5,872,507 A | * | 2/1999 | Weber et al. ................ 340/435 |
| 6,009,970 A | | 1/2000 | Breed |
| 6,053,045 A | | 4/2000 | Nakamura |
| 6,169,479 B1 | | 1/2001 | Boran et al. |
| 6,332,115 B1 | | 12/2001 | Nobusawa et al. |

* cited by examiner

Primary Examiner—Anh V. La
(74) Attorney, Agent, or Firm—Gary Smith

(57) ABSTRACT

A collision protection system for protecting a pedestrian that uses a sensor that provides a width output signal that varies in relation to the width of an object contacting the vehicle. The sensor includes a resistive conductor that is shorted out by a conductive conductor of a portion of the length of the resistive conductor. A second sensor may be provided that provides an output only upon exceeding an impact threshold. Several sensors may be used to provide an indication of the location and width of the object contacted.

4 Claims, 3 Drawing Sheets

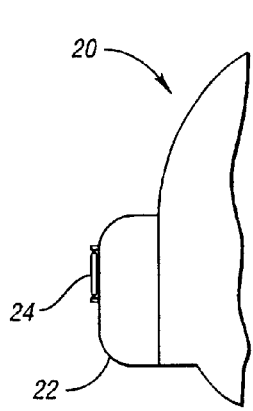
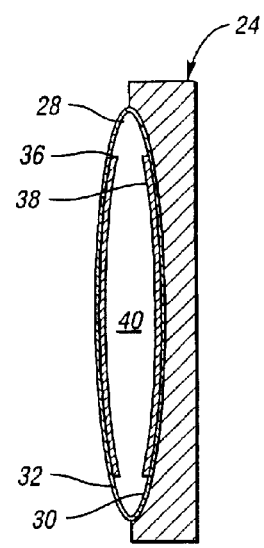
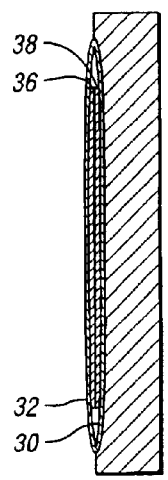
Fig. 1  Fig. 2  Fig. 3
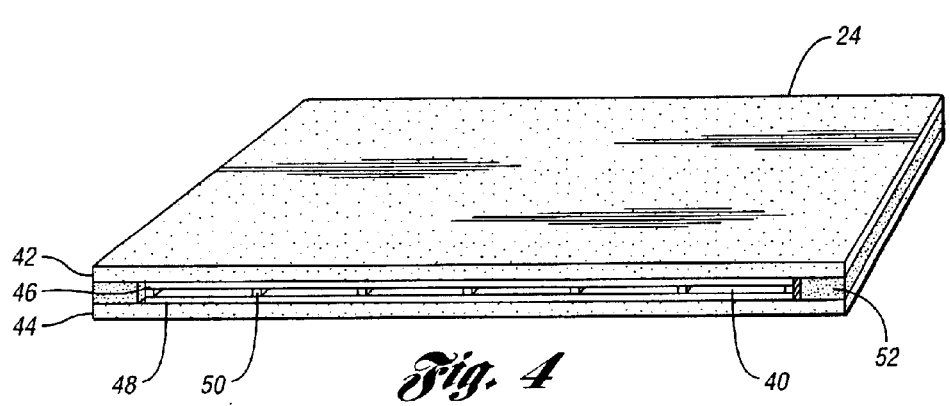
Fig. 4
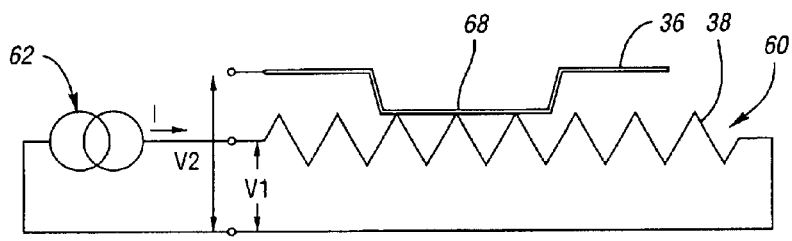
Fig. 5

SYSTEM FOR SENSING WHETHER AN OBJECT STRUCK IN A COLLISION IS A PEDESTRIAN

BACKGROUND OF THE INVENTION

1. Field of the Invention

This invention relates to sensors for measuring the location and the width of an impacted object.

2. Background Art

Sensors and sensing systems for active restraints on vehicles generally include accelerometers, speed sensors, piezoelectric sensors, flex tape switches, ribbon switches and the like. Such prior art sensors and systems do not have the capability of determining the width of an object struck by the sensor on the vehicle. The systems also fail to provide a mechanism for determining the location of an impact on the sensor. Ribbon switches or tape switches such as those disclosed in U.S. Pat. Nos. 3,694,600; 5,847,643; or 6,009,970 produce an output indicating that the strip switch or ribbon switch has been contacted but fail to provide any indication as to the width of the area contacted or the location of the area contacted on the elongated switches.

Information regarding the size and location of a collision would be useful for pedestrian protection systems or airbag deployment systems. If a pedestrian is struck by a vehicle, the greatest risk of injury is the risk of injury to the pedestrian. If, on the other hand, a pole, bridge abutment or another vehicle is contacted by a vehicle, the principal risk of injury is to the driver and passengers of the vehicle. In such instances, impact sensors are used to activate interior active restraint systems such as dashboard airbags or side curtains.

There is a need for sensors that can sense the location and size of an object struck by a vehicle. In side or front impacts, the location and width of the impact zone, if sensed, could assist the vehicle's crash mitigation system to determine what active restraints should be deployed. Information regarding the location, width and severity of an impact can also be used to control the speed of actuation or selection of particular active restraints that would be most appropriate for the protection of vehicle occupants or pedestrians.

There is a need for a simple, inexpensive device for sensing the severity, location, and width of an impact. This information may be integrated with other sensor outputs by a control system to provide an intelligent crash mitigation system.

SUMMARY OF THE INVENTION

According to the present invention, a collision protection system is provided that controls a collision protection apparatus such as an inflatable member or the like. A sensor located on an exterior surface of a vehicle is adapted to provide a width output signal that varies in relation to the width of an object contacting the vehicle. A controller is provided for the collision protection apparatus that receives the width output signal from the sensor and compares the width output signal to a threshold value to determine if the width of the object is less than a predetermined width. The controller actuates the pedestrian collision protection apparatus if the object is less than the predetermined width and exerts a force on the sensor between a lower and an upper threshold.

The system described above may include a collision protection apparatus such as an external inflatable member that is deployed between the object, such as a pedestrian, and the vehicle. The collision protection apparatus may also comprise a hood release that shifts the hood of the vehicle to a raised position that permits the hood to absorb forces applied thereto by the object or pedestrian. The collision protection apparatus may also be an interior active safety restraint system that is actuated either with other restraint systems or independently thereof to protect an occupant of the vehicle from injury caused by a pedestrian who is struck by the vehicle.

According to another aspect of the invention, the sensor may be an elongated strip that extends in a generally horizontal direction across an exterior panel of the vehicle such as the bumper or fender. The strip has electrical contacts that are at least partially compressed in the event of an impact. The width output signal of the sensor is related to the portion of the strip that is compressed. The strip may be a tubular member having at least two spaced electrodes that are normally held apart by the tube. The two spaced electrodes are pressed together along a portion of their length in the event of an impact. The two spaced electrodes provide an electrical signal that indicates the portion of the length of the tube that is compressed. The two spaced electrodes may comprise a carbon ink strip and a copper electrode that are held apart by dielectric dots.

The system may also include an interior sensor secured to a vehicle or location recessed from the surface of the vehicle. The interior sensor may generate an impact force signal in the event of an impact of sufficient force to actuate the interior sensor. The controller may receive the impact force signal from the interior sensor and may disable the collision protection apparatus if it determines that the object struck is not a pedestrian. The interior sensor may be disposed in a cavity formed in a structural foam bumper member.

According to another aspect of the invention, an apparatus for determining if a pedestrian is struck by a vehicle is provided. The apparatus comprises an elongated sensor extending across an exterior region of the vehicle. The sensor has at least two spaced electrodes that are supported on a compressible member. The compressible member is locally compressible along a portion of the region of the vehicle across which the sensor extends. The two spaced electrodes provide an electrical signal that varies in proportion to the portion of the compressible member that is compressed. A controller receives the electrical signal and calculates the length of the portion of the compressible member that is compressed. An impact absorbing member is deployed if the length of the portion of the compressible member compressed is less than a threshold length corresponding to the approximate, predetermined width of a pedestrian at the height of the sensor on the vehicle. The system then determines whether the object struck by the vehicle is a pedestrian.

According to other aspects of the invention, the electrical signal provided by the sensor may also vary in response to the location of the portion of the compressible member that is compressed. If so, the controller may determine the location of the portion of the compressible member that was compressed. The impact absorbing member may be an external inflatable member, a hood raising mechanism, or the like.

According to another aspect of the invention, a sensing system is provided for determining the width of an object in the event of an impact force being applied thereto. The sensing system includes a strip having first and second portions that are spaced apart that connect to a conductive electrode attached to the first portion, and a resistive electrode that is attached to the second portion. A voltage source is connected to the resistive electrode to provide a constant current through the resistive electrode. Upon impact, the conductive electrode contacts the resistive electrode and shorts out the portion of the resistive electrode that is contacted by the conductive electrode. This decreases the resistance of the resistive electrode which decreases the voltage developed.

The sensing system may also comprise a resistive electrode formed as a first part that increases in resistivity from right to left and a second part that increases in resistivity from left to right. The first and second parts are positioned adjacent to one another so that the conductive electrode contacts both parts during an impact thereby shorting the first and second parts of the resistive electrode. By comparing the voltages developed in each part, the width and location of the impact may be determined.

According to another aspect of the invention, the resistive electrode may be formed as a plurality of discrete conductive lines that are located in a generally linear array. Each line is connected to one of a series of resistors so that when the conductive electrode contacts one or more of the conductive lines upon impact, the conductive electrode circumvents the resistors corresponding to the conductive lines. This circumvention reduces the resistance of the resistive electrode and decreases the voltage developed.

These and other aspects of the invention will be better understood in view of the attached drawings and the following detailed description of the several embodiments of the invention disclosed.

BRIEF DESCRIPTION OF DRAWINGS

FIG. 1 is a fragmentary side elevation view of a vehicle having a bumper including a sensor made in accordance with the present invention;

FIG. 2 is a cross-sectional view of one embodiment of a sensor made in accordance with the present invention in its non-compressed state;

FIG. 3 is a cross-sectional view similar to FIG. 2 showing the sensor in its compressed state;

FIG. 4 is a perspective view of a portion of a section of a sensor strip made in accordance with the present invention;

FIG. 5 is a schematic diagram of a circuit for a sensor for detecting the width and center of an impact;

DETAILED DESCRIPTION

Figure 6:
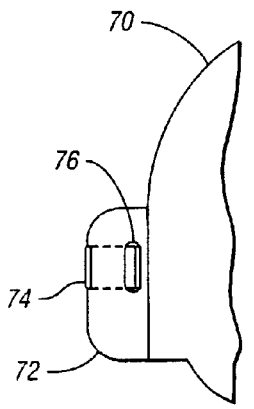
FIG. 6 is a side elevation view of a bumper having a surface sensor and recessed sensor that is only contacted when the impact force exceeds a certain level.

Referring now to FIG. 1, a portion of a vehicle 20 is shown including a bumper 22 having a sensor 24 that senses the width of an object contacted by the sensor.

Referring now to FIG. 2, the sensor 24 is shown in greater detail including a hollow tube 28 having an inner wall 30 and an outer wall 32. A conductive electrode 36 preferably made of copper or other highly conductive material is connected to one of the walls 30, 32 and as illustrated is connected to the outer wall 32. A resistive electrode 38 is attached to one of the walls 30, 32 and as illustrated is connected to the inner wall 30. The resistive electrode 38 may be a carbon electrode in the illustrated embodiment. A resistive electrode 38 is defined as an electrode having a relatively higher resistance than the conductive electrode 36. An air gap 40 is formed between the conductive electrode 36 and the resistive electrode 38 when the sensor 24 is in its normal, non-compressed state as shown in FIG. 2.

As shown in FIG. 3, the conductive electrode 36 and resistive electrode 38 are placed in contact with each other as the outer wall 32 is compressed towards the inner wall 30.

Referring now to FIG. 4, a schematic representation of the sensor 24 is shown wherein a first substrate 42 and a second substrate 44 are shown in parallel spaced relationship to each other. The substrate may be formed of a wide variety of material, for example, polyester sheet. A copper electrode 46 is provided on the first substrate 42 and carbon ink 48 is deposited on the second substrate 44. A plurality of dielectric dots 50 are provided in the air gap 40 that hold the copper electrode 46 and carbon ink 48 apart unless a force is applied to one of the substrates to compress them together. An adhesive gasket 52 is provided on the perimeter portions of the substrates 42, 44. The two substrates 42, 44 are sealed together at their periphery by the adhesive gasket 52 so that the two electrodes 46 and 48 face each other and are separated by the dielectric dots 50. When the sensor 24 is backed by a rigid material such as the structural foam forming a portion of a bumper or a fender or door of a car, and sufficient force is applied to the external surface thereof, the outer substrate 42, 44 bends and allows the electrodes 46, 48 to make contact between the dielectric dots 50. A similar technique is used in vehicles in the manufacture of horn switches in steering wheels for vehicles. In contrast to horn switches, however, the sensor 24 provides location and width information as is more particularly described below.

Referring now to FIG. 5, one method of measuring resistances is illustrated. In FIG. 5, a circuit 60 is provided that includes a current source 62. Voltages $V_1$ and $V_2$ are measured to calculate the width and center of the impact.

The arrangement shown in FIG. 5 may be referred to as a terminated electrode embodiment wherein electrical connections are made to both ends of the resistive electrode 38 and to some point on the conductive strip 36. All three connections to the conductive electrode 36 and resistive electrode 38 may be made with a single connector at one end of the sensor 24. When the sensor strip 24 is struck in a collision, it collapses in the impact zone represented by the portion of the conductive electrode 36 that is placed in contact with resistive electrode 38 and is identified as the impact contact area 68. If the resistance of the strip before impact is $R_0$, and during the impact resistances of those portions of the strip to the left and right of the impact are $R_L$ and $R_R$, respectively, the width and center of impact, nor malized to the length of the strip, are given in terms of these quantities by:

$$W = 1 - \frac{R_L + R_R}{R_0} \quad C = \frac{1}{2}\left(1 + \frac{R_L - R_R}{R_0}\right)$$

If a constant current is sent through the resistive strip as shown in FIG. 5, the two voltages $V_1$ and $V_2$ are measured. The width and center are given in terms of these quantities and $V_0$, the value of $V_1$ prior to the impact by:

$$W = 1 - \frac{V_1}{V_0} \quad C = \frac{1}{2} + \frac{V_2 - \frac{1}{2}V_1}{V_0} \quad (1)$$

Figure 9:
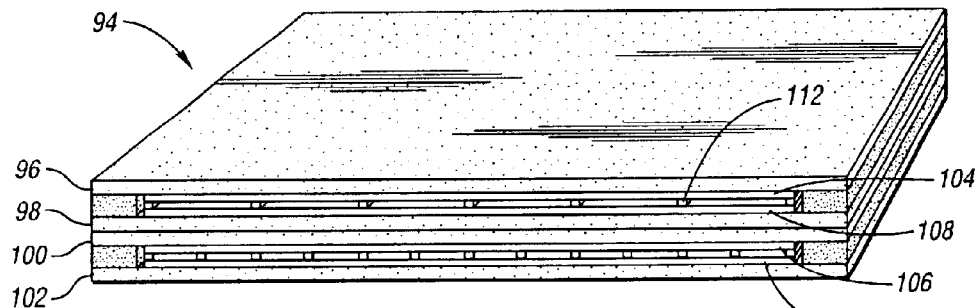
FIG. 9 is a perspective view of a double sensor.

Referring to FIG. 9, the sensor can be used to detect front bumper impacts with a pedestrian based upon the low pressure that a pedestrian's leg is able to produce against the bumper and the distinctive small impact width. This may be accomplished by providing two separate strips as shown in FIG. 6 or by adding another pair (or double pair) of electrodes in a three layer sandwich as shown in FIG. 9. Two separate strips could be used as shown in FIG. 6 with one sensor 74 near the front of the bumper 72 and the other sensor 76 located in a cavity within the structural foam of the bumper. Alternatively, the second sensor could be mounted behind another structural member so that it is protected from the impact unless the foam or other member is deformed. Regarding the embodiment of FIG. 9, the spacing and/or thickness of the dielectric dots may be adjusted so that the outer pair of electrodes is brought into contact with a relative low force that would be produced when a pedestrian is struck. The inner pair of electrodes requires a much larger force, such as would be generated in striking another car, or tree, etc. Either the terminated electrode embodiment or the floating electrode embodiment can be used to detect the force of a collision by using two sensors, as in FIG. 6, or a three layer sandwich, as in FIG. 9.

The embodiment shown in FIG. 6 can also be used to determine the speed of impact for an impact that activates both sensors 74 and 76. Knowledge of impact speed may be useful, for example, in determining the force with which to fire an airbag. The exterior sensor 74 closes immediately upon striking an object. The interior sensor 76 does not close, however, until the cavity in which it is located has been collapsed by the intruding foam or structural member in front of it. If the cavity had an original depth d and the second sensor 75 closes a time δt after the first sensor 74, then the speed of impact is d/δt. (The timing will be affected if the foam in front of the cavity does not move as a rigid body but is compressed during the collision; however, this effect can be calibrated based upon the relative rigidity of the foam.)

Referring to FIG. 9, the alternative embodiment of the sensor 94 is described more specifically, The sensor includes a first substrate 96, a second substrate 98, a third substrate 100, and a fourth substrate 102. The substrates are preferably formed of a flexible material such as polyester or can also be formed as an extruded polymeric material. A first copper electrode 104 and second copper electrode 106 are shown secured to the first and third substrates 96, 100. A first strip of carbon ink 108 and a second strip of carbon ink 110 are provided on the second and fourth substrates 98, 102. A first set of dielectric dots 112 is provided between the first copper electrode 104 and the first strip of carbon ink 106 while a second set of dielectric dots 114 are provided between the second copper electrode 106 and the second strip of carbon ink 110. The second set of dielectric dots 114 is more closely spaced than the first set of dielectric dots 112. The portion of the sensor having a higher dot density is preferably disposed closer to the bumper.

Figure 7:
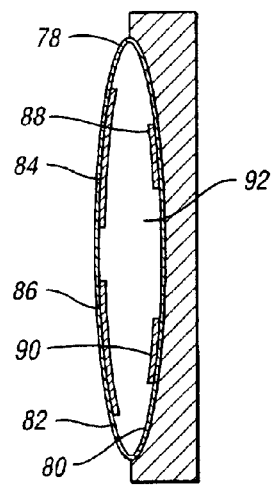
FIG. 7 is a cross-sectional view of a floating electrode sensor strip showing two conductive strips and two resistive strips in its uncompressed state.
Figure 8:
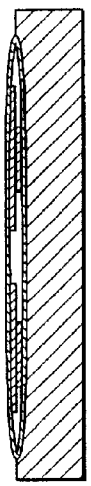
FIG. 8 is a cross-sectional view of a floating electrode sensor strip showing two conductive strips and two resistive strips in their compressed state.

Referring now to FIGS. 7 and 8, an alternative embodiment of a floating electrode sensor system is shown. Like the embodiments of FIGS. 2 and 3, the sensor includes a hollow tube 78 having an inner wall 80 and an outer wall 82. First and second conductive electrodes 84 and 86 are shown on the outer wall 82. However, it should be understood that the conductive electrodes can also be placed on the inner wall 82. First and second resistive electrodes 88 and 90 are shown disposed on the inner wall 80. An air gap 92, as illustrated in FIG. 7, represents the sensor in its uncompressed stage while the air gap 92 is substantially diminished or eliminated in FIG. 8 which shows the sensor as compressed after impact.

Figure 10:
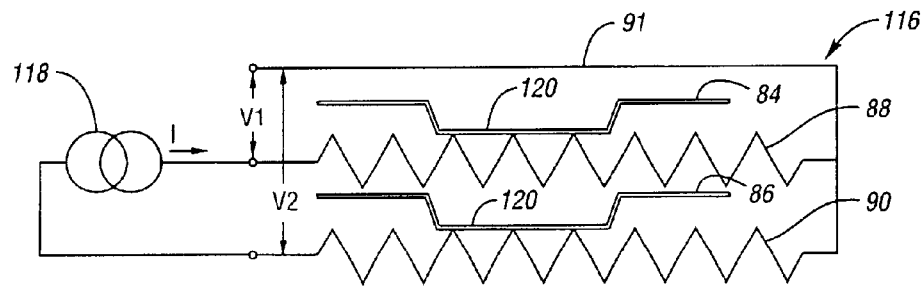
FIG. 10 is an electrical schematic of the floating electrode sensor made in accordance with the present invention.

Referring now to FIG. 10, a floating electrode circuit embodiment 116 of the electrical circuit is illustrated that may be used with the embodiment shown in FIGS. 7 and 8. In the floating electrode embodiment, each electrode is split into two parts. No electrical connections are required to the conductive electrode which remains electrically "floating." The resistivity (ohm per meter) of the resistive electrodes varies along their length as described below.

The floating electrode circuit 116 includes a current source 118 that is connected to a resistive electrode 88 and a second resistive electrode 90. The resistive electrodes 88 and 90 are also connected to a common electrical lead 91. A first voltage $V_1$ may be measured across resistive electrode 88 and lead 91 while a second voltage $V_2$ is measured across resistive electrode 90 and lead 91. An impact area 120 is shown across a portion of resistive electrode 88 and 90. In the impact area, the resistive electrodes 88 and 90 are shorted out by conductive electrodes 84 and 86, respectively, thereby reducing the resistance of the circuit including the resistive electrodes 88 and 90.

The resistivity r of each resistive electrode 88 and 90 increases linearly from one end of the strip to the other. That is, r is a function of the distance x along the strip as given by the following formula:

$$r(x) = r_c + r_v x \quad (2)$$

where $r_c$ and $r_v$ are design constants. The total resistance of the strip of length L is:

$$R_0 = \int_0^L r(x)\,dx = r_c L + \frac{1}{2}r_v L^2 \equiv R_c + R_v \quad (3)$$

The electrodes are oriented in opposite directions so that as one electrode increases in resistivity from left to right, the other increases in resistivity from right to left. The electrodes are electrically connected as shown in FIG. 10. As described above with reference to FIG. 5, an impact collapses the portion of the strip causing each conductive electrode to short out a portion of the corresponding resistive electrode behind it. In this case, the normalized width and center of impact are given by:

$$W = 1 - \frac{R_1 + R_2}{2R_0} \quad C = \frac{1}{2}\left(1 + \frac{R_2 - R_1}{2\alpha R_0 W}\right) \quad (4)$$

where $R_1$ and $R_2$ are measured resistances of the first and second resistive electrodes under impact conditions, and $\alpha \equiv R_v/R_0$ is a design constant. A preferred method of measuring resistance is to send a constant current through the resistive electrodes and measure the voltages developed. In terms of voltages, W and C are:

$$W = 1 - \frac{V_1 + V_2}{2V_0} \quad C = \frac{1}{2}\left(1 + \frac{V_2 - V_1}{2\alpha V_0 W}\right) \quad (5)$$

The error associated with measuring the partially-shorted resistances during impact may be shown as resultant errors as follows:

$$\text{Error}(W) = -\frac{1}{2}\text{Error}(R) \quad (6)$$

$$\text{Error}(C) = \frac{1 + \alpha(2C-1)}{2\alpha W} \text{Error}(R) \xrightarrow[\alpha \to 1]{} \frac{C}{W}\text{Error}(R)$$

By selecting parameters $R_c$ and $R_v$ the effect of the error in the calculated quantities can be minimized. Error (W or C) is the error in estimating W or C for a given Error(R) in measuring $R_1$ or $R_2$, where Error (R) is expressed as a fraction of $R_0$, the resistance in the absence of impact. To minimize Error (C) in estimating the location of impact, $\alpha$ should be close to 1 and thus the ratio of resistivity at the two ends of the strip, $(r_c + r_v L)/r_c$ should be substantially larger than 1. Location error also depends inversely on impact width W. For this reason, it is desirable to make the device stiff enough along its length so that a narrow object collapses the tube over some minimum length (for example 5% of the strip).

Figure 11:
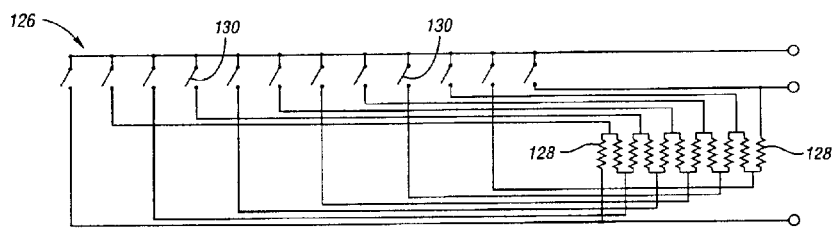
FIG. 11 is an electrical schematic showing an alternative embodiment of the present invention having a discrete resistor circuit having a terminated electrode.

FIG. 11 is a schematic drawing of a terminated electrode circuit 26 that includes a plurality of discrete resistors 28 that are connected to a plurality of corresponding switch contacts 130. Upon impact, one or more of the switch contacts 130 are closed which short circuits or circumvents the resistors 128 to which the switch contacts 130 are connected.

The array of switch contacts 130 can be formed in a number of ways. The contacts could, for example, be a plurality of conductive electrode pairs spaced apart by dielectric dots similar to the configuration shown in FIG. 4, wherein one or more of the pairs being closed by an impact. Alternatively, a plurality of switches 130 could be closed by an associated non-contact sensor operating on the basis of capacitive, ultrasonic, or other principles. An impending collision could be detected by each non-contact sensor within its own immediate field of detection. Actuation of the switches 130 by non-contact sensors could allow the width and location of the colliding object to be estimated before collision occurs.

Figure 12:
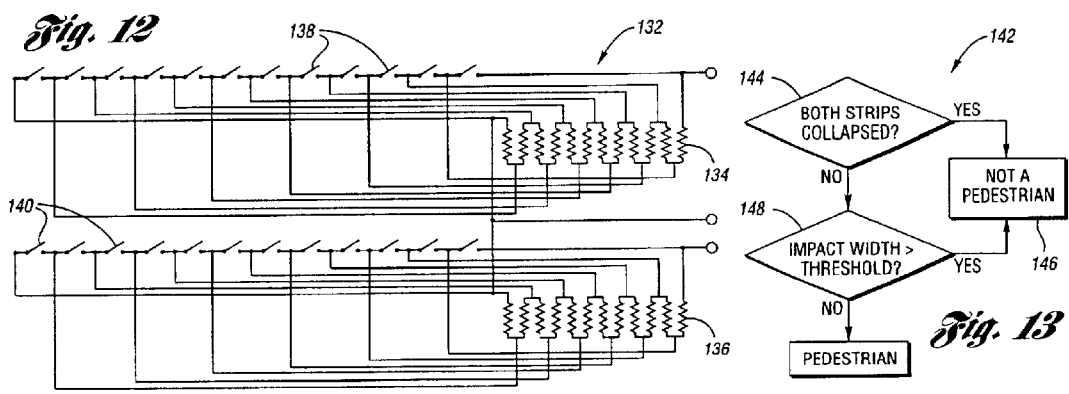
FIG. 12 is an electrical schematic showing a floating electrode discrete resistor circuit.

Referring now to FIG. 12, a floating electrode circuit 132 is illustrated that includes a first set of resistors 134 and a second set of resistors 136 that are connected, respectively, to a first set of switch contacts 138 and a second set of switch contacts 140. In the event of an impact of sufficient severity to close at least some of the first and second set of switch contacts 138, 140, an indication of the width of the object contacted is provided. The resistors 134, 136 that are circumvented reduce the resistance of the circuit. As in the configuration of FIG. 11, the switches 138 and 140 could be actuated by non-contact sensors to estimate the width and location of a colliding object before the collision occurs.

Figure 13:
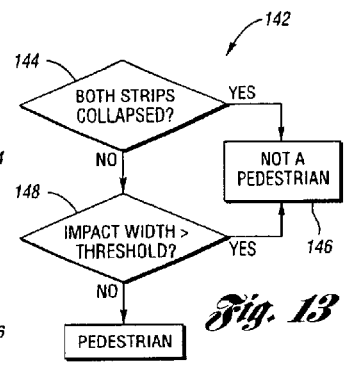
FIG. 13 is a logic diagram for determining if a struck object is a pedestrian according to a two variable model.

Referring now to FIG. 13, a logic diagram for determining if the struck object is a pedestrian is shown. The logic diagram is generally indicated by reference numeral 142. At 144, the system determines whether both of the sensor strips have collapsed. If so, it is determined that the object struck is not a pedestrian at 146. If both strips are not collapsed, then the system determines whether the impact is greater than a predetermined width that is set as a threshold at 148. If it is greater than the predetermined width, the system determines that the object struck is not a pedestrian at 146. If the impact width is less than the threshold, it is determined that the object struck is a pedestrian and a collision protection system is activated.

While the best mode for carrying out the invention has been described in detail, those familiar with the art to which this invention relates will recognize various alternative designs and embodiments for practicing the invention as defined by the following claims.

What is claimed is:

1. A sensing system for determining the width of an object in the event of an impact force being applied thereto, comprising:

a strip having first and second portions that are spaced apart, a conductive electrode being attached to the first portion and a resistive electrode being attached to the second portion;

a voltage source is connected to the resistive electrode that provides a constant current through the resistive electrode, wherein upon impact the conductive electrode contacts the resistive electrode and shorts out the portion of the resistive electrode that is contacted by the conductive electrode decreasing the resistance of the resistive electrode which decreases the voltage developed; and wherein the resistive electrode is formed as a first part that increases in resistivity from right to left and a second part that increases in resistivity from left to right, wherein the first and second parts are positioned adjacent to one another and the conductive electrode contacts both of the first and second parts in an impact shorting the first and second parts, wherein by comparing the voltages developed in each part the width and location of the impact is determined.

2. A sensing system for determining the width of an object in the event of an impact force being applied thereto, comprising:

a strip having first and second portions that are spaced apart, a conductive electrode being attached to the first portion and a resistive electrode being attached to the second portion;

a voltage source is connected to the resistive electrode that provides a constant current through the resistive electrode, wherein upon impact the conductive electrode contacts the resistive electrode and shorts out the portion of the resistive electrode that is contacted by the conductive electrode decreasing the resistance of the resistive electrode which decreases the voltage developed; and wherein the resistive electrode is formed as a plurality of discrete conductive lines located in a generally linear array, wherein each line is connected to one of a series of resistors, the conductive electrode contacting one or more of the conductive lines upon impact reducing the resistance and decreasing the voltage developed.

3. A sensing system for determining the speed of an impact with an object, comprising:

an exterior sensor attached to a body, the exterior sensor being closed initially upon striking the object;

an interior sensor that is inset relative to the exterior sensor in a cavity in the body, the interior sensor being closed after the object causes the body to collapse the cavity wherein the cavity is located at a depth d and the interior sensor closes at a time $\delta t$ after the exterior sensor closes, whereby the speed of impact is $d/\delta t$.

4. The sensing system of claim 3 wherein the body is formed of foam that is compressed during the impact, and wherein the speed of impact calculation is calibrated based upon the relative rigidity of the foam.

* * * * *